Patented Oct. 9, 1934

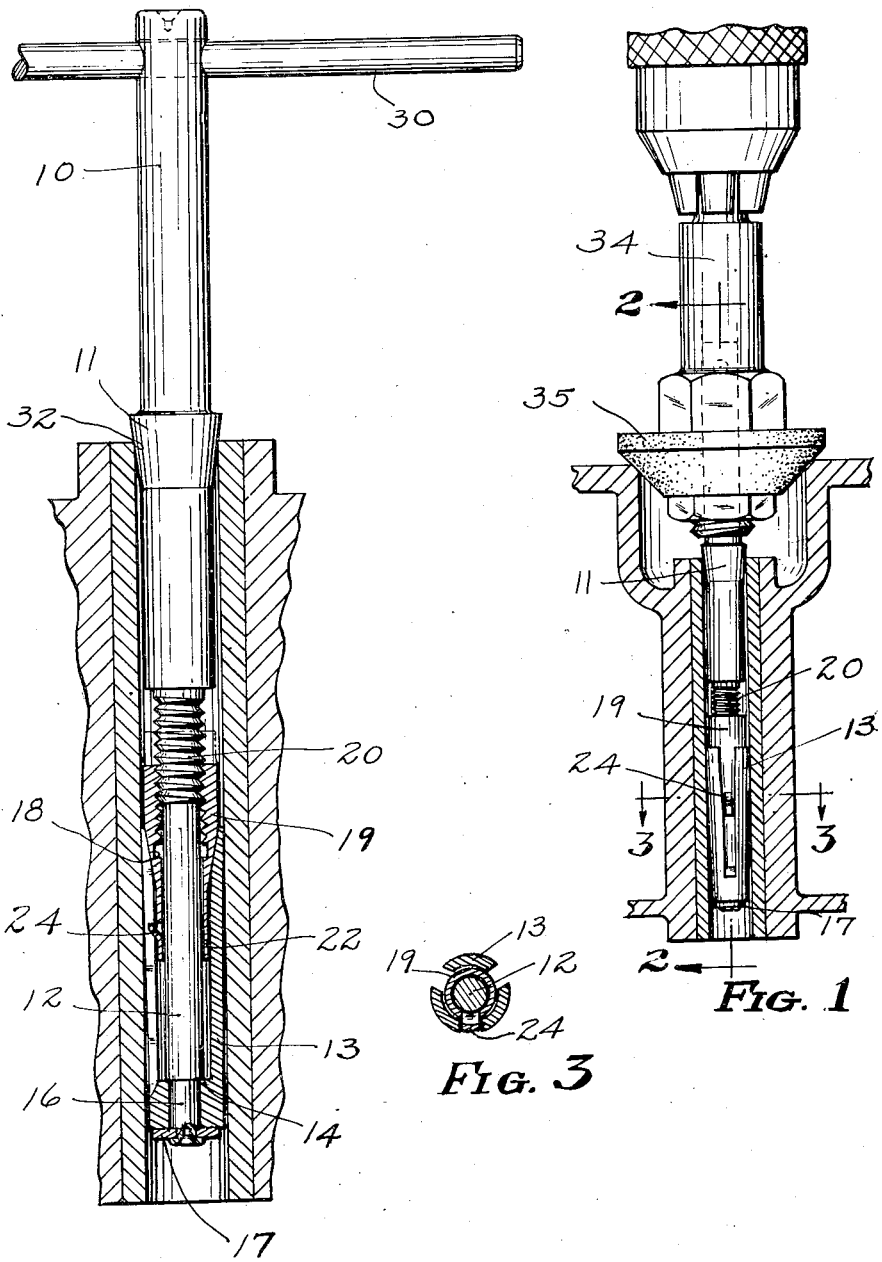

1,975,904

UNITED STATES PATENT OFFICE 1,975,904

SPINDLE MECHANISM FOR GAS ENGINE VALVE RESEATERS

Blaine B. Ramey, Stoneleigh, Md., and William C. Sessions, Cleveland, Ohio, assignors to The Black & Decker Manufacturing Company, Towson, Md., a corporation of Maryland Application July 23, 1932, Serial No. 624,338

4 Claims. (Cl. 51—241)

The general objects of the present invention is the provision of a device, utilizable in connection with tools for machining and resurfacing of automotive engine valve seats. More specifically, the object of our invention is the provision of a self-aligning spindle which may be readily inserted in the valve stem bore of a gas engine block or head, and which may be secured therein in a firm manner, with the axis of the spindle coincident with the center line of the valve stem bore, regardless of the depreciated condition of the bore and whereby a valve grinding or reaming tool will be afforded a centered bearing mounting relative to the center line of the valve stem bore and the perimeter of the valve seat.

Other objects of our invention will become apparent from the description hereinafter set forth, and which description refers to the drawing. The essential objects thereof will be summarized in the claims.

Fig. 1 is a fragmentary cross-sectional view, taken through parts of a gas engine cylinder block, showing the spindle structure operatively positioned therein; Fig. 2 is an enlarged cross-sectional view of the device, showing an additional part thereof in cross-section, while Fig. 3 is a cross-sectional view taken substantially along the lines 3—3 of Fig. 1.

Our invention comprises a spindle body member which serves to rotatably support a grinding tool or reamer, and associated means for aligning the upper and lower ends of the spindle body with the center line of the bore. The upper cylindrical extension 10 comprises the actual bearing part of the spindle for the grinding tool. Below the body portion 10 is a stop shoulder in the form of a tapered portion 11, which serves to align the upper portion 10 with the circumference of the valve stem bore of the engine block, and there is a lower portion 12, upon which is pivotally mounted a split expansible collet or sleeve 13. The sleeve 13 is fixed longitudinally of the spindle by reason of a shoulder provided at 14 on the collet, which bears against a complementary shoulder afforded by the decreased lower end portion 16 of the spindle body, which is of a decreased diameter relative to the body portion 12. Any suitable means, such as a washer 17, is fixed upon the lower end of the spindle to retain the sleeve loosely on the spindle end. The upper split end of the sleeve is provided with an internal taper 18. This tapered surface is acted upon by an externally tapered spreader sleeve 19, internally threaded to engage the threads 20 formed upon the middle portion of the spindle body. The threaded sleeve 19 is provided at its lower end with a relatively thin tubular portion 22, which is disposed within the sleeve 13, and is provided with an outwardly extending lug portion 24, and serving to loosely key the split sleeve 13 and the spreader sleeve 19 together to prevent relative rotation therebetween when the threads 20 cause the spreader sleeve to positively move longitudinally of the spindle, thus either positively spreading or permitting self-contraction of the upper end of the split sleeve, as desired.

Any means, such as a bar 30, may afford a convenient grip for manually inserting, turning and removing the device, into, while in, and from the valve stem bore, respectively.

The device operates as follows: The spindle body and split sleeve are relatively adjusted to have the sleeve sufficiently expanded to frictionally engage the valve stem bore. The device is then slipped into the bore until the tapered shoulder 11 contacts the upper perimeter 32 of the valve stem bore. Slight turning movement of the spindle body by the bar 30 will cause the spreader sleeve to be screwed downwardly, due to the fact that friction prevents the split sleeve 13 from turning and the spreader sleeve is loosely keyed to the split sleeve by lug 24. Thus the taper on the spreader sleeve causes the upper split end of the split sleeve to be uniformly and firmly expanded against the circumferential surface of the valve stem bore. The bar 30 is then removed and a tool holder 34 having a central bore dimensioned to afford a slit fit with the upper cylindrical portion 10 of the spindle body, is then positioned on the spindle. The holder 34 may have a seat cutting tool or an abrasive wheel 35 fixed thereon in any convenient manner.

The holder may be turned manually or by an electric drill motor, the chuck part of which is shown in Fig. 1 as being attached to the upper end of the shank of the tool holder 34.

We claim:

1. A spindle for mounting valve grinding devices in operative position comprising a spindle body having a downwardly extending taper adjacent its upper end, a thread formation on the spindle intermediate the ends thereof, a split sleeve rotatably supported on the lower end of the spindle, and a spreader sleeve mounted on said thread and keyed to the split sleeve.

2. In a device of the character described, the combination of a solid spindle member comprising a rod having an upper cylindrical end adapted to extend above the valve stem bore of a gas engine when the spindle is inserted therein, a tapered portion adapted to contact with the upper perimeter of the valve stem bore, said spindle body having an external thread formed intermediate its upper and lower extremities, an externally tapered internally threaded sleeve in engagement with the threads on the spindle body member, a split sleeve member pivotally mounted on the spindle body member adjacent its lower end, said split sleeve member having an internal tapered surface coacting with the taper on the spreader sleeve and means for preventing relative rotation of the spreader sleeve and split sleeve when the spreader sleeve is shifted longitudinally of the spindle body member by relative rotation of the spreader sleeve and said spindle body.

3. In a device of the character described, a spindle body having a thread formation on the spindle, a split sleeve rotatably supported on the spindle, and a spreader sleeve mounted on said threads to be movable relative to the split sleeve and means interengaging the spreader sleeve and the split sleeve to prevent relative rotation therebetween when the spindle is turned and means independent of the spreader sleeve to prevent relative longitudinal movement between the split sleeve and the spindle.

4. In a device of the character described, the combination of a solid spindle body member comprising a rod having an upper end adapted to extend above the valve stem bore of a gas engine when the spindle is inserted therein, said rod having an external thread formed thereon, an externally tapered internally threaded sleeve in engagement with the threads on the spindle body member and movable longitudinally of the spindle, a split sleeve member pivotally mounted on the spindle body member and non-shiftable longitudinally thereof, said split sleeve member having an internal tapered surface coacting with the taper on the spreader sleeve and means for preventing relative rotation of the spreader sleeve and split sleeve when the spreader sleeve is shifted longitudinally of the spindle body member by relative rotation of the spreader sleeve and said spindle body and means independent of the threaded sleeve to prevent relative axial movement between the spindle and the split sleeve.

BLAINE B. RAMEY.
WILLIAM C. SESSIONS.